US006155355A

United States Patent [19]

Holmin

[11] Patent Number: 6,155,355

[45] Date of Patent: Dec. 5, 2000

[54] TORQUE IMPULSE TOOL WITH AUTOMATIC POWER SHUT-OFF COMPRISING TWO INERTIA BODIES

[75] Inventor: Mats Cornelius Holmin, Saltsjöbaden, Sweden

[73] Assignee: Atlas Copco Tools AB, Nacka, Sweden

[21] Appl. No.: 09/319,991

[22] PCT Filed: Dec. 16, 1997

[86] PCT No.: PCT/SE97/02101

§ 371 Date: Jun. 15, 1999

§ 102(e) Date: Jun. 15, 1999

[87] PCT Pub. No.: WO98/26903

PCT Pub. Date: Jun. 25, 1998

[30] Foreign Application Priority Data

Dec. 16, 1996 [SE] Sweden .................................. 9604611

[51] Int. Cl.[7] .................................................. B23Q 5/00

[52] U.S. Cl. ........................................... 173/176; 173/178

[58] Field of Search ..................................... 173/176, 178, 173/177, 179; 415/25; 418/43; 192/150; 81/470

[56] References Cited

U.S. PATENT DOCUMENTS

| | | | |
|---|---|---|---|
| 2,727,598 | 12/1955 | Mitchell et al. | 173/178 |
| 3,275,116 | 9/1966 | Martin | 173/178 |
| 3,385,377 | 5/1968 | Amtsberg et al. | 173/178 |
| 3,643,749 | 2/1972 | Pauley | 173/176 |
| 3,703,933 | 11/1972 | Schoeps | 173/178 |
| 3,785,442 | 1/1974 | Amtsberg et al. | 173/179 |
| 3,930,764 | 1/1976 | Curtiss | 418/43 |
| 4,004,859 | 1/1977 | Borries | 173/177 |
| 4,120,604 | 10/1978 | Garofalo | 173/177 |
| 4,222,702 | 9/1980 | Rush | 173/179 |
| 4,307,784 | 12/1981 | Smith | 173/179 |
| 5,082,066 | 1/1992 | Schoeps | 173/178 |
| 5,492,185 | 2/1996 | Schoeps et al. | 173/177 |

*Primary Examiner*—Peter Vo
*Assistant Examiner*—Jim Calve
*Attorney, Agent, or Firm*—Frishauf, Holtz, Goodman, Langer & Chick, P.C.

[57] ABSTRACT

A torque impulse tool for screw joint tightening includes a housing, a pneumatic motor with a rotor, an output shaft, a hydraulic impulse generator coupling the rotor to the output shaft, and an automatic power shut-off device including a pressure air inlet valve communicating with the pneumatic motor and shiftable between a fully open condition, a partially open condition and a closed condition. In addition, an activation mechanism is provided which is co-rotative with the rotor and which includes a connection member engaging the inlet valve for shifting the inlet valve between the fully open condition, the partially open condition and the closed condition. The activation mechanism includes (i) a first inertia member arranged to accomplish shifting of the inlet valve from the partially open condition to the closed condition as a predetermined maximum retardation magnitude level is reached in the rotor, and (ii) a second inertia member arranged to accomplish shifting of the inlet valve from the partially open condition to the fully open condition at retardation magnitudes in the rotor exceeding a predetermined threshold level, below the maximum retardation magnitude level, thereby providing a reduced motor speed and power output during an initial tightening stage.

11 Claims, 5 Drawing Sheets

TORQUE IMPULSE TOOL WITH AUTOMATIC POWER SHUT-OFF COMPRISING TWO INERTIA BODIES

FIELD OF THE INVENTION

This invention relates to a torque impulse tool for tightening screw joints and including an automatic power shut-off means. In particular, the invention concerns a torque impulse tool of the type comprising a housing, a hydraulic impulse generator, a pneumatic motor with a rotor drivingly coupled to the impulse generator, wherein the shut-off means includes an air inlet valve communicating with the motor and shiftable between an open condition and a closed condition, and a retardation responsive activation means corotative with the rotor and including an inertia actuator, and a connection member coupling the inlet valve to the activation means for shifting the inlet valve from the open condition to the closed condition when activated by the activation means as a predetermined maximum retardation magnitude level is reached.

BACKGROUND OF THE INVENTION

A previously known torque impulse tool of this type is described in U.S. Pat. No. 5,082,066.

A problem concerned with this type of tools is that the very first delivered torque impulse tends to be powerful enough to cause a premature shut-off of the tool. This is due to the fact that in many cases the rotation speed during running down of the screw joint is very high and, accordingly, the kinetic energy of the impulse unit and the motor is very high. This kinetic energy produces a powerful first torque impulse which is strong enough to activate the retardation responsive actuation means and make the inlet valve close. The risk for a premature shut-off is particularly great when tightening so called stiff joints, i.e. screw joints having a steep torque growth characteristic per unit angle of rotation, because in such cases the first impulse is amplified by a very quick and abrupt growing torque resistance in the joint.

At screw joints with a steep torque growth characteristic, there is also a risk that the very first generated torque impulse becomes so powerful that the desired target torque level for the screw joint is passed and an undesirable torque overshoot is caused.

In the above referred U.S. Pat. No. 5,082,066, there is disclosed a speed responsive mechanism for blocking the inertia actuator at rotation speeds above a certain level. This means that the actuating means is prevented from being activated at the first torque impulse, and that the problem of having a premature power shut-off is overcome. At the impulses generated after the first one, the rotation speed and the kinetic energy of the rotating parts of the tool is considerably smaller and, consequently, the energy per impulse is much smaller too. Therefore, the blocking mechanism is deactivated and the inertia actuator is free to initiate power shut-off.

However, the problem of getting too powerful a first impulse and a subsequent undesireable torque overshoot is not overcome by this known device. There is no means provided to reduce the energy of the very first torque impulse.

OBJECT OF THE INVENTION

The main object of the invention is to provide a torque impulse tool comprising means for obtaining a reduced motor speed and power output during the initial stage of each tightening process, thereby reducing the kinetic energy of the motor and impulse generator at the first torque impulse such that an undesireable torque overshoot and/or a premature power shut-off is avoided.

Further objects and advantages of the invention will appear from the following specification and claims.

A preferred embodiment of the invention is hereinbelow described in detail with reference to the accompanying drawings.

DETAILED DESCRIPTION

Figure 1:
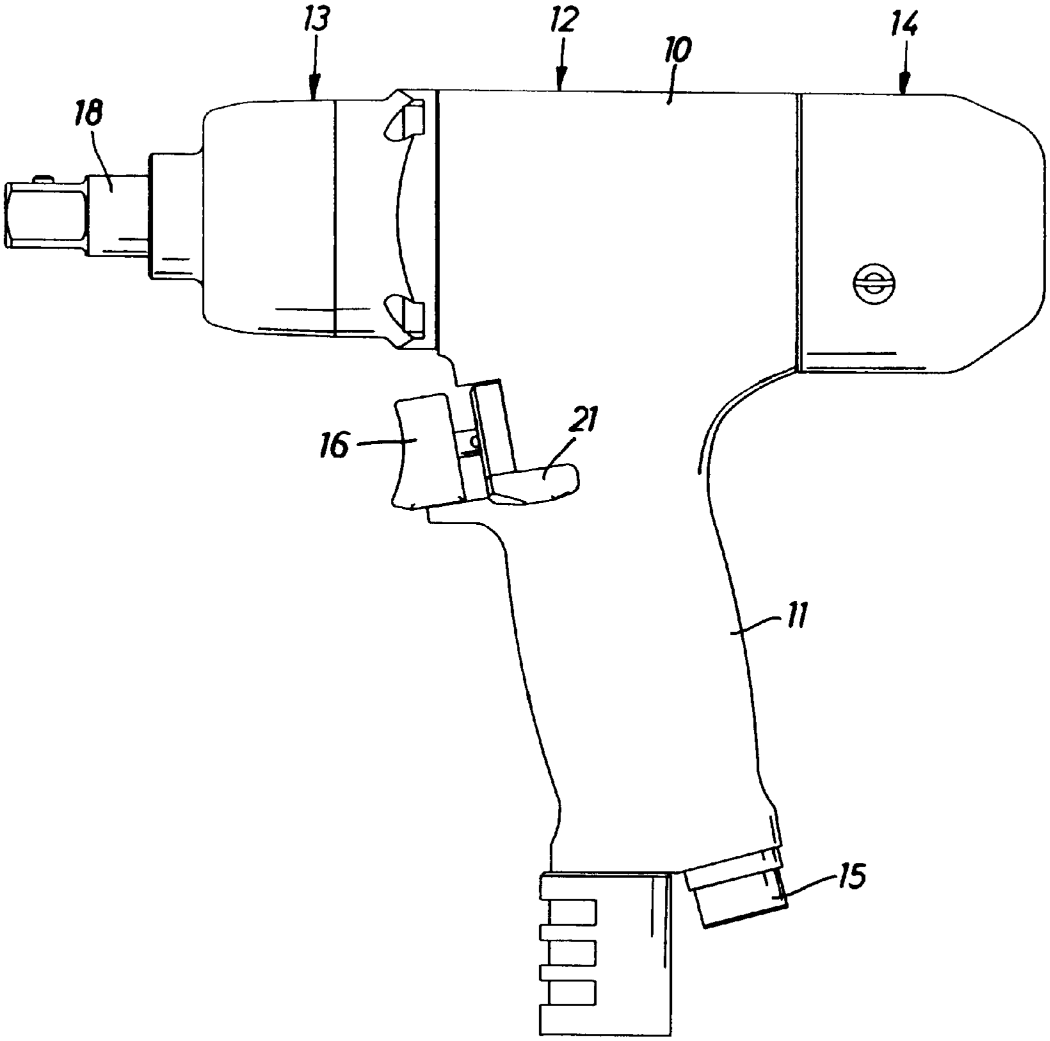
FIG. 1 shows a side view of a torque impulse tool according to the invention.

The tool illustrated in FIG. 1, is a pistol type portable power wrench with a housing 10 which includes a handle 11, a motor section 12, a transmission section 13 and a power control section 14. The tool is supplied with pressure air via an inlet connection 15 on the handle 11, a throttle valve operable by a trigger 16 and an inlet passage 17. On the handle there is also provided a reverse valve 21 for changing the direction of rotation of the tool. A square ended output shaft 18 is intended to carry a nut socket for connection to a screw joint to be tightened.

In the transmission section, there is supported a torque impulse generator (not shown) which is of any conventional design, vane type or piston type, having the output shaft 18 as an integrated part. The impulse generator transforms the continuous output torque of the motor to repeated torque impulses for application on a screw joint to be tightened.

The motor section 12 includes a vane type air motor of any commonly used design which is not described in detail. The rotor 100 of the motor is rigidly connected at its one end to the impulse generator (not shown) and at its opposite end to a retardation responsive activation means 19 (see FIGS. 2*a*, 2*b*, and 2*c*. The latter forms a part of an automatic power control means, including a pressure air inlet valve 20 communicating with the motor via a feed passage 22 in the housing 10.

The inlet valve 20 comprises a flat cylindrical valve element 24 which is sealingly guided in a valve chamber 25 located at the rear end of the housing 10 in a coaxial disposition relative to the rotation axis of the motor. The valve element 24 is axially supported by the head 26 of a connection member or activation rod 27 and a reset spring 28 which takes support against a transverse wall 29 in the housing 10. The valve element 24 is not secured to the activation rod head 26, but can be moved separately in the valve chamber 25.

Figure 2A:
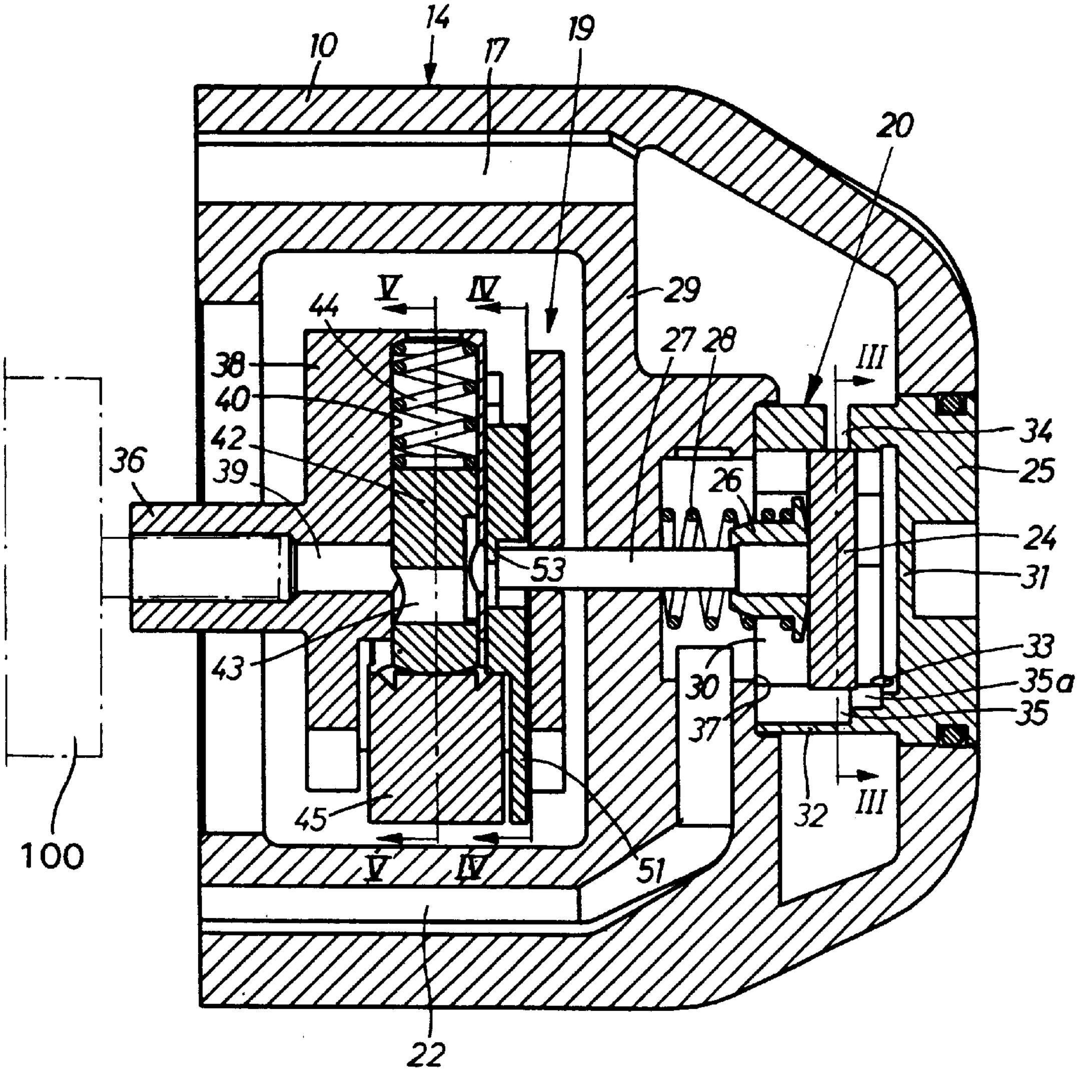
FIG. 2*a* shows a longitudinal section through the power control section of the tool in FIG. 1, illustrating a partial flow condition of the air inlet valve.
Figure 2B:
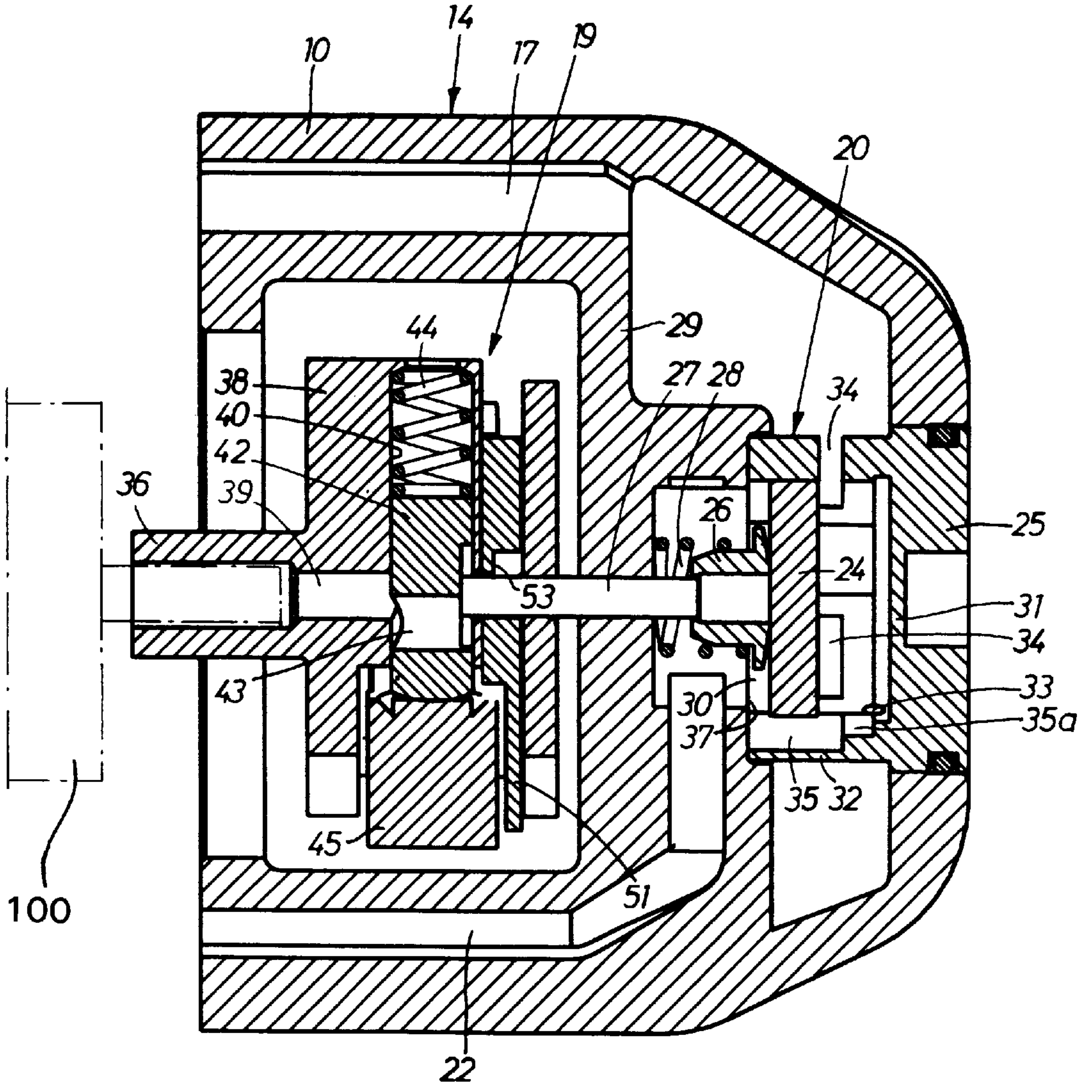
FIG. 2*b* shows the same section as FIG. 2*a*, but illustrates an open condition of the air inlet valve.
Figure 2C:
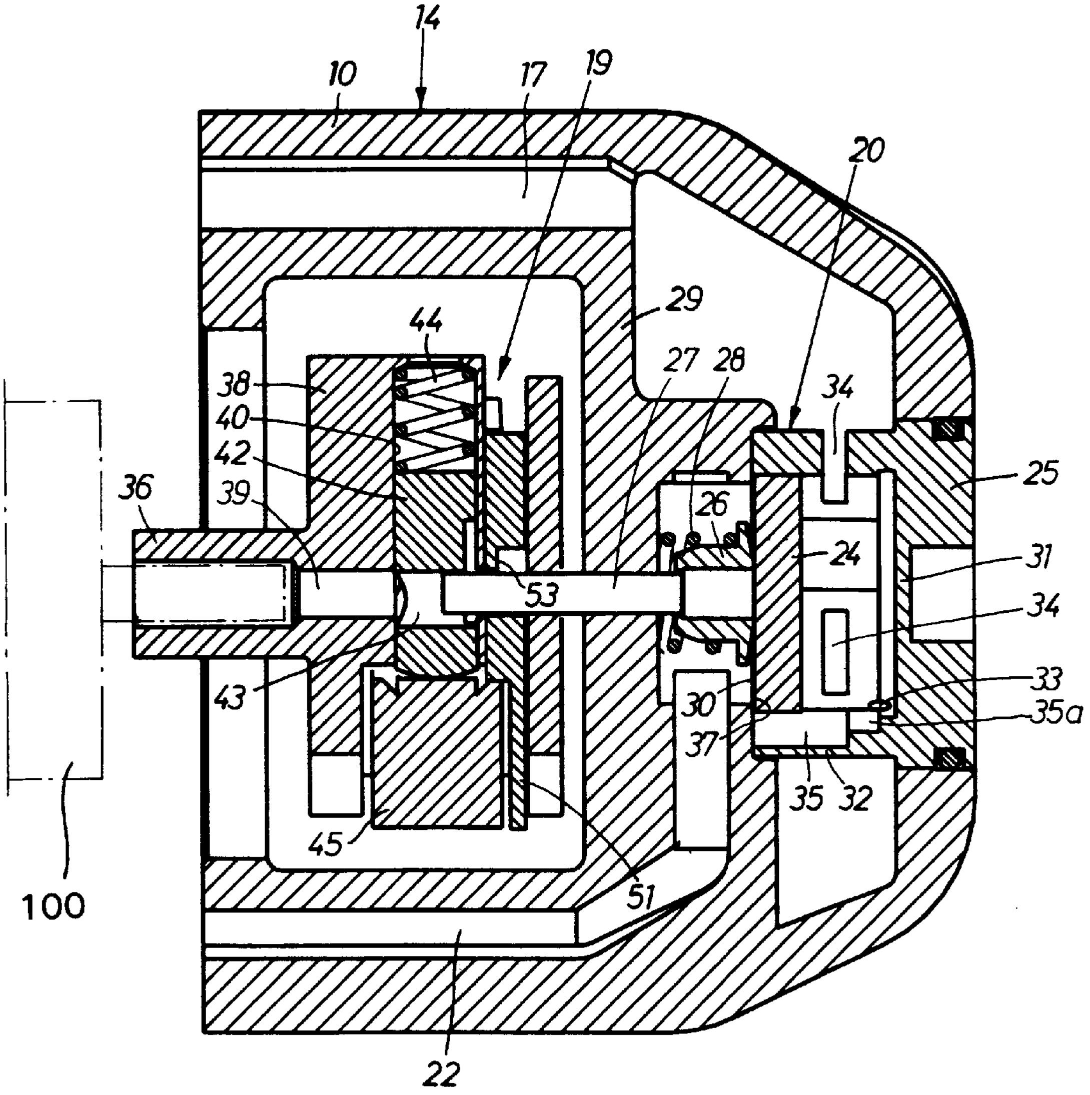
FIG. 2*c* shows the same section as FIG. 2*a*, but illustrates a closed condition of the air inlet valve.
Figure 3:
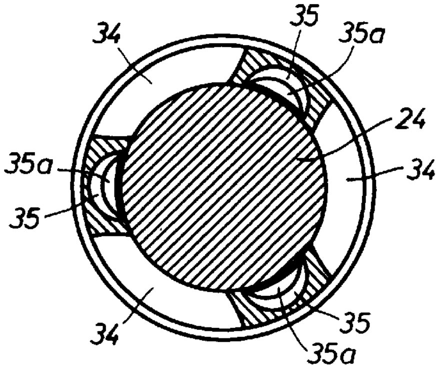
FIG. 3 shows a cross section along line III—III in FIG. 2*a*.

The valve chamber 25 is cup shaped having a rear end wall 31 and a tubular guide portion 32 with a concentric outlet opening 30. The tubular portion 32 is formed with two small size inlet openings 33 (one only is illustrated in FIGS. 2*a*, 2*b*, 2*c*) located close to the read end wall 31. The valve chamber 25 further comprises three slot like large size inlet openings 34 located at a common axial level separated from the small size openings 33 and three axially directed air feed grooves (bypass passages) 35 located between the large size openings 34. See FIG. 3. Each one of the air feed grooves 35 has a reduced area portion 35*a* adjacent the end wall 31, the purpose of which is to create a suitable pressure drop across the valve element 24 in the partial flow position of the latter. At its forward end, the tubular valve chamber portion 32 rests against a shoulder 37 in the housing 10. The shoulder 37 forms a valve seat for sealing cooperation with the valve element 24 said one or more bypass passages 35, 35*a* as well as the outlet opening 30 have a flow area equal to or larger than the total flow area of the inlet openings 33 and the outlet opening 34.

Figure 5:
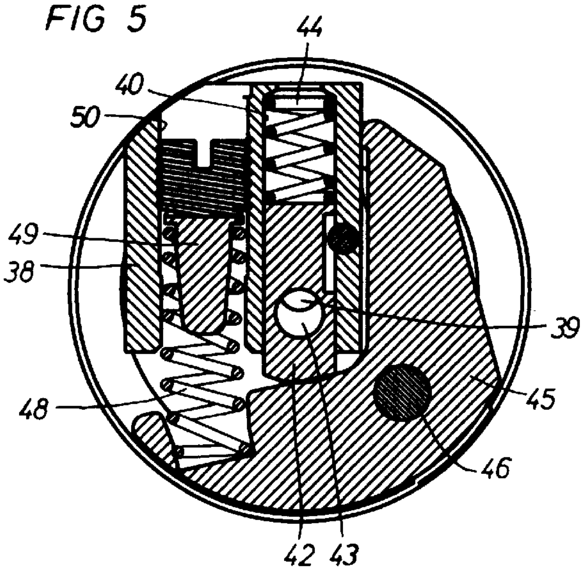
FIG. 5 shows a cross section along line V—V in FIG. 2*a*.

The retardation responsive activation means 19 comprises a hub 38 which is rigidly secured to the motor rotor by means of a socket portion 36 and which is formed with a coaxial through bore 39. In a transverse bore 40 in the hub 38 there is movably guided a trip element 42 having a transverse opening 43, and a bias spring 44. As illustrated in FIG. 5, the trip element 42 is biassed by the spring 44 into contact with an L-shaped inertia actuator 45. The latter is movably mounted on a pivot pin 46 which is located in parallel with but laterally offset the rotation axis of the motor. As illustrated in FIG. 5, the inertia actuator 45 is biassed toward a rest position, by a spring 48 which is backed by an adjustable support plug 49 threaded into a second transverse bore 50 in the hub 38.

Figure 4:
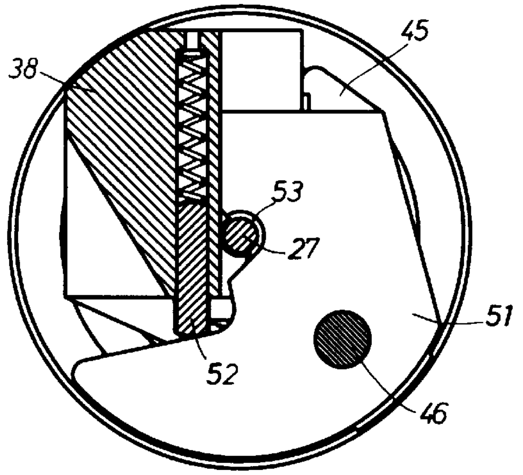
FIG. 4 shows a cross section along line IV—IV in FIG. 2*a*.

Movably supported on the same pivot pin 46 as the inertia actuator 45 and located in a plane parallel with the inertia actuator 45, there is a secondary retardation responsive rotative inertia member or latch 51. A spring activated bias pin 52 is arranged to urge the rotative latch 51 toward a rest position, as illustrated in FIG. 4. The rotative latch 51 is formed with a shoulder 53 for engagement with the forward end of the valve activation rod 27.

In operation, the tool is connected to a pressure air source via the inlet connection 15 and to a screw joint to be tightened by means of a nut socket attached to the output shaft 18. As a tightening operation is to be started, the valve element 24 occupies the position illustrated in FIG. 2*a*, wherein the valve element 24 is loaded by the air pressure in the rear part of the valve chamber 25 against the head 26 of the activation rod 27. In this position, pressure air is supplied to the valve chamber 25 via the inlet passage 17 and the small size openings 33. The large area inlet openings 34 are covered by the valve element 24. The force of the reset spring 28 is lower than the air force now acting on the valve element 24, and the resulting load on the activation rod 27 urges the latter axially toward the activation means 19.

At the very start of a tightening process, the rotation speed is zero and no torque impulses have been generated. The inertia actuator 45 together with the trip element 42 as well as the rotative latch 51 occupy their rest positions, as illustrated in FIGS. 2*a*, 4 and 5, which means that the activation rod 27 is endwise supported on the shoulder 53 of the rotative latch 51. In this position of the activation rod 27, the air flow from the openings 33 is further restricted as it passes through the reduced area portions 35*a* of the air feed grooves 35, which means that their is a pressure drop across the valve element 24. This pressure drop generates a force on the valve elements 24 to maintain the latter in contact with the head 26. The valve element 24 now occupies a partial flow condition, which means that pressure air is supplied to the motor through the small size openings 33, past the valve element 24 via the feed grooves 35*a* and 35 and further through the feed passage 22.

In this partial flow condition of the valve 24, the power output of the motor is reduced, which means that the rotation speed of the output shaft 18 is relatively low during the initial running down stage of the screw joint and before the very first impulse is generated. As the torque resistance from the screw joint increases to a certain level, a first impulse is generated by the torque impulse generator. However, the energy of this first impulse is low due to the low motor speed, and the retardation magnitude is high enough just to cause the rotative latch 51 to be displaced against the bias force of the spring activated pin 52. This results in the shoulder 53 being removed from the end portion of the activation rod 27 allowing the latter to be axially displaced toward the trip element 42. Due to the air pressure acting on the valve element 24, the latter follows the activation rod under continuous contact with the head 26. See FIG. 2*b*.

As the activation rod 27 contacts the trip element 42, the valve element 24 occupies its open condition in which the large area inlet opening 34 are uncovered. Now, the motor is powered with full air pressure and starts accelerating to gain as high kinetic energy as possible before the nextcoming impulses to be generated. However, the motor starts from stillstand or at least a very low speed level after the first impulse has been delivered, which means that the succeeding acceleration phase will last for no more than 360 degrees of rotation. This means that the rotation speed at the next-coming impulse generating point will be limited to a normal level as will the delivered impulse energy.

Normally, after a certain number of impulses delivered to the screw joint, the installed torque has become high enough to cause a retardation magnitude capable of moving the inertia actuator 45 against the action of springs 44 and 48 to thereby, displace the trip element 42. After still a few impulses, the trip element 42 is displaced far enough to make the opening 43 be aligned with the activation rod 27. Then, the latter is free to move forwardly by the action of the air pressure in the valve chamber 25. This results in the valve element 24 being shifted to its closed condition, thereby cooperating with the seat 37. See FIG. 2*c*.

It is to be understood that the maximum retardation level by which the tool is shut-off is higher than the retardation level at which the rotative latch 51 is activated and the valve element 24 is shifted from its partial opening condition to its open condition.

The low initial power supply and the resulting low motor speed during the screw joint running down phase ensures that there will be more than one impulse delivered to the joint before the retardation magnitude of the activation means is high enough to initiate power shut-off. This guarantees that there will be no first single high energy impulse by which the screw joint may be overtightened and the air supply is shut-off.

As the intended torque level is obtained in the screw joint and the pressure air supply to the motor is shut-off, the valve element 24 will remain in its closed condition as long as the throttle valve is open and pressure air is still supplied to the valve chamber 25. When the throttle valve is closed and the air pressure in the valve chamber 25 is discontinued, the reset spring 28 is able to retract the activation rod 27 and the valve element 24 such that the end portion of the rod 27 is pulled out of the opening 43 of the trip element 42 and placed reawardly of the rotary latch 51. Thereby, both of the trip element 42 and the rotary latch 51 are free to reoccupy their rest positions as illustrated in FIGS. 2*a*, 4 and 5.

When the tool is intended to be operated in the reverse direction, the reverse valve 21 is shifted to feed pressure air to the opposite side of the motor. The air feed passage 22 will now act as an exhaust passage from the motor. At the same time, the air inlet passage 17 is connected to the atmosphere, which means that there will be no pressure in the valve chamber 25 to maintain the valve element 24 in contact with the head 26 of the activation rod 27. Instead, the pressure of the exhaust air entering the valve chamber 25 via the open end 30 of the latter will shift the valve element 24 to a position close to the end wall 31, thereby uncovering the large area slot openings 34 for an unrestricted flow of exhaust air through the inlet valve 20.

What is claimed is:

1. A torque impulse tool for tightening screw joints comprising:

a housing;

a pneumatic motor with a rotor;

an output shaft;

a hydraulic impulse generator coupling said rotor to said output shaft;

an automatic power shut-off device including a pressure air inlet valve communicating with said pneumatic motor and shiftable between a fully open condition, a partially open condition and a closed condition; and an activaiton mechanism co-rotative with said rotor and including a connection member engaging said inlet valve for shifting said inlet valve between said fully open condition, said partially open condition and said closed condition;

wherein said activation mechanism comprises:

(i) a first inertia member arranged to support said connection member and said inlet valve in said fully open condition via a trip element and to displace said trip element to accomplish shifting of said inlet valve from said fully open condition to said closed condition as a predetermined maximum retardation magnitude level is reached in said rotor; and (ii) a second inertia member arranged to support said connection member and said inlet valve in said partially open condition via a shoulder and to displace said shoulder to accomplish shifting of said inlet valve from said partially open condition to said fully open condition at retardation magnitudes in said rotor exceeding a predetermined threshold level, below said maximum retardation magnitude level.

2. The impulse tool according to claim 1, wherein:

said fist inertia member and said second inertia member are displaceable in two parallel planes perpendicular to the rotation axis of said rotor; and said trip element is located on an opposite side of said second inertia member with respect to the connection member such that as said predetermined threshold level is reached engagement between said connection member and said second inertia member is interrupted and said connection member moves axially to be supported by said trip element.

3. The impulse tool according to claim 1, wherein said second inertia member and said first inertia member are pivotally displaceable about a common axis which is parallel to but offset from the rotation axis of said rotor.

4. The impulse tool according to claim 3, wherein said second inertia member and said first inertia member are pivotally displaceable about a common axis which is parallel to but offset from the rotation axis of said rotor.

5. The impulse tool according to claim 4, wherein said inlet valve comprises:

a cylindrical valve chamber provided with a first inlet, a second inlet and an outlet;

a valve element axially movable in said valve chamber between said partially open condition, said fully open condition and said closed condition; and one or more bypass passages connecting said first inlet to said outlet as said valve element occupies said partially open condition and connecting both of said first inlet and said second inlet to said outlet as said valve element occupies said fully open condition.

6. The impulse tool according to claim 5, wherein:

said first inlet has a smaller flow area than said second inlet; and said one or more bypass passages as well as said outlet have a flow area equal to or larger than the total flow area of said first inlet and said second inlet.

7. The impulse tool according to claim 5, wherein said valve element is freely movable from said closed condition to an unrestricted full flow condition, whereby free passage for exhaust air flow is obtained at reverse operation of said motor.

8. The impulse tool according to claim 1, wherein said inlet valve comprises:

a cylindrical valve chamber provided with a first inlet, a second inlet and an outlet;

a valve element axially movable in said valve chamber between said partially open condition, said fully open condition and said closed condition; and one or more bypass passages connecting said first inlet to said outlet as said valve element occupies said partially open condition and connecting both of said first inlet and said second inlet to said outlet as said valve element occupies said fully open condition.

9. The impulse tool according to claim 8, wherein:

said first inlet has a smaller flow area than said second inlet; and said one or more bypass passages as well as said outlet have a flow area equal to or larger than the total flow area of said first inlet and said second inlet.

10. The impulse tool according to claim 9, wherein said valve element is freely movable from said closed condition to an unrestricted full flow condition, whereby free passage for exhaust air flow is obtained at reverse operation of said motor.

11. The impulse tool according to claim 8, wherein said valve element is freely movable from said closed condition to an unrestricted full flow condition, whereby free passage for exhaust air flow is obtained at reverse operation of said motor.

* * * * *